Patented Oct. 25, 1938

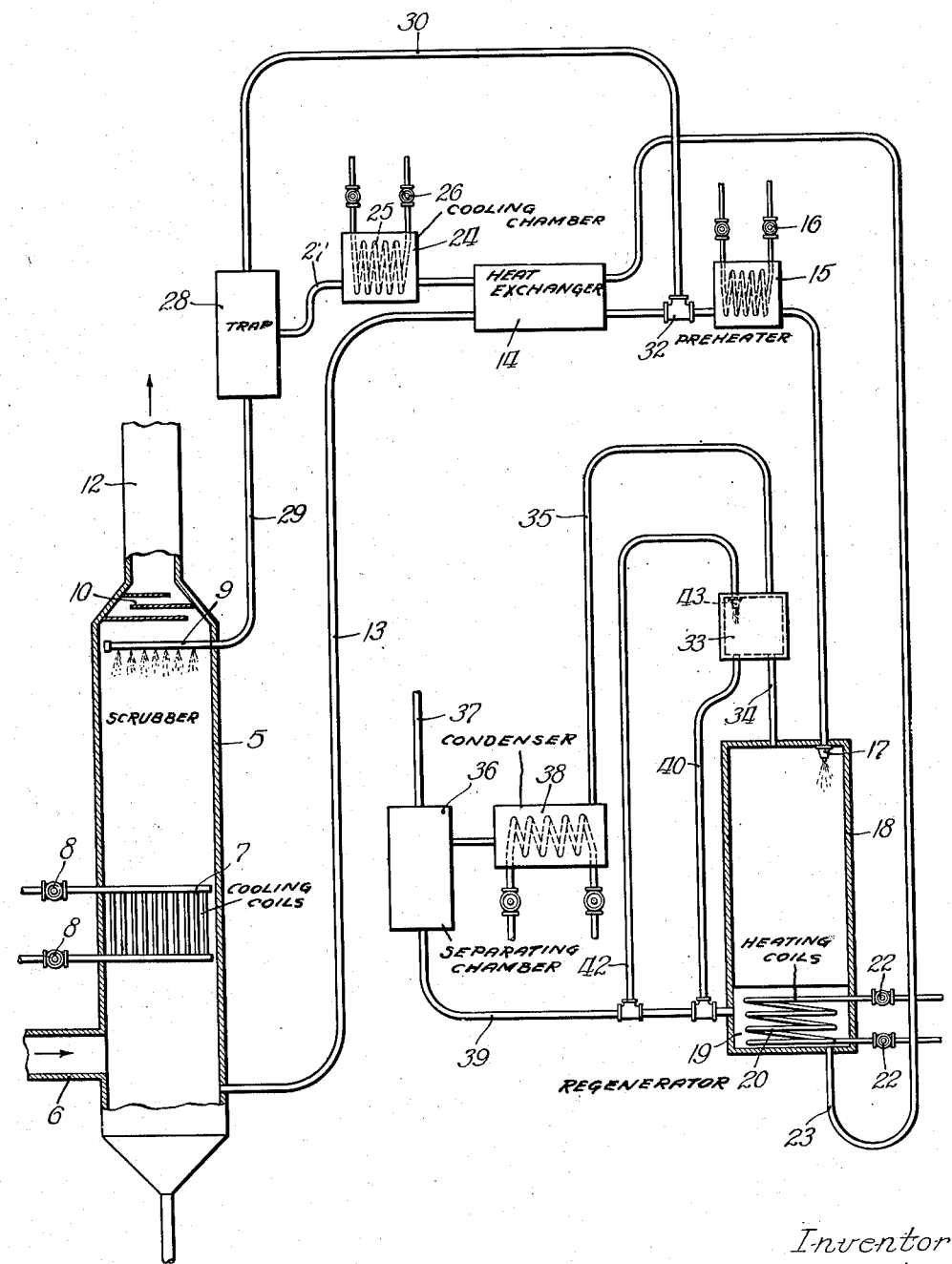

2,134,482

UNITED STATES PATENT OFFICE 2,134,482

PROCESS OF RECOVERING SO₂ FROM WASTE GASES

Henry F. Johnstone, Urbana, Ill., assignor, by mesne assignments, to Commonwealth Edison Company, Chicago, Ill., a corporation of Illinois Application December 28, 1935, Serial No. 56,433

5 Claims. (Cl. 23—178)

This invention relates to a process for removing and recovering sulphur dioxide from waste gases, such as flue gases, smelter gases and other similar gases containing sulphur dioxide as one of the constituents thereof, and more particularly is directed to an improved process for recovering the absorbed sulphur dioxide carried in the washing solution or extracting solution and simultaneously regenerating this solution for further use.

Broadly, the invention is a continuation and refinement of the process disclosed in my copending application, Serial No. 665,337, filed April 10, 1933, now Patent No. 2,082,006, and contemplates the absorption of sulphur dioxide from gases containing the same into an aqueous solution of a sulphite and bisulphite, such as ammonium sulphite and ammonium bisulphite, which is maintained at a relatively low temperature during the absorption phase of the process, and is then heated to drive off the absorbed sulphur dioxide and to regenerate the solution.

One of the principal items of cost in the recovery of sulphur dioxide by means of the cyclic ammonia-sulphur dioxide-water system is the quantity of steam required in the regeneration phase of the cycle, that is the removal of the dissolved sulphur dioxide from the extracting solution. I have found that this quantity depends principally upon the following factors:

1. Concentration of sulphur dioxide in the raw gases.
2. Temperature of absorption.
3. Temperature of regeneration.
4. Concentration of ammonia in the solution.

The ease of separation of sulphur dioxide from the solution is dependent upon the relative vapor pressure at the temperature of regeneration as compared with that at the temperature of absorption, or in other words, upon the temperature coefficient of the equilibrium vapor pressure of sulphur dioxide. Another factor which determines the quantity of steam required for regeneration is the temperature coefficient of the vapor pressure of water. As a general rule, for any sulphite-bisulphite solution the temperature coefficient of the sulphur dioxide is nearly constant, regardless of the composition and of the nature of the cation present, so long as the ionization of all the electrolytes present is substantially complete. The temperature coefficient of the water vaporization is also constant for these solutions, and is nearly identical with that for sulphur dioxide. In other words, the ratio of the vapor pressure of water at any temperature to that at any other temperature is substantially the same as the ratios of the sulphur dioxide vapor pressures at corresponding temperatures in the presence of electrolytes for which there is a distinct shift in ionic equilibrium, such as ionization, hydrolysis and the like, as the temperature changes, the temperature coefficient of the sulphur dioxide vaporization may be distinctly different from that of the simple solution.

Prior attempts to utilize these modified solutions in order to reduce the steam requirements for regeneration, as disclosed in United States Letters Patent No. 1,908,731, issued May 16, 1933, to Clark, and German Patent No. 553,910, issued July 2, 1932, to Gumlich and Richter, have not been, for the most past, completely successful. The utilization of such modified solution is of only limited application, subject to use for gases containing either very low or very high concentrations of sulphur dioxide, because the secondary reactions responsible for a high temperature coefficient only take place in a limited range of acidity of the solution. Also, the cost of the solutions renders their use prohibitive for ordinary commercial use, and certain ancillary reactions, such as decomposition, precipitation and the like, take place which disturb the cyclic process.

The present invention overcomes these difficulties by the use of a simple chemical which causes the secondary reactions mentioned above to take place, for the most part, in the regenerator, where the maximum effect on the sulphur dioxide vapor pressure is desired.

One of the primary objects of the present invention is the provision of a closed circuit flow of a medium which acts to modify the solution in the regenerator to increase the vapor pressure of the sulphur dioxide during regeneration, which circuit is confined to the regeneration phase of the process and which may be cyclic in operation and independent of the main process.

This object is attained by circulating, around the regenerator only, a liquid acid which is relatively insoluble in the aqueous sulphite-bisulphite solution at the absorption temperature and which has high solubility at the regeneration temperature. It is apparent that the greater the change in solubility of the acid, the greater the effect it will have on the sulphur dioxide vapor pressure. An ideal acid for this purpose is one which is suitable in other respects and has the characteristic of a critical solution temperature in the solution at or near the boiling point of water.

I have found that both normal and iso-valeric acids have critical solution temperatures in water within this range. However, the solubilities are decreased by the presence of the salts so that the critical solution temperatures in the sulphite solutions are increased. In dilute solutions, e. g. those of low ammonia concentrations, the effect of these acids and of their isomers, having the formula $C_5H_{10}O_2$, is extremely marked and greatly increases the efficiency of the process.

Likewise, both normal butyric and iso-butyric acids, while completely miscible in water near room temperatures, have their critical solution temperature raised considerably by the presence of the sulphite. These acids, therefore, are suitable for use along with high concentrations of ammonia.

Normal caproic acid and the isomeric acids having the formula $C_6H_{12}O_2$ are other acids for which the temperature effect on the solubility is favorable.

It is realized that mixtures of the isomeric acids may be preferred for economic reasons, and mixtures of the acids of the three formulae mentioned above may even be desirable.

The use of such an acid or mixture of acids, having the characteristic of a critical solution temperature at or near the boiling point of the extracting solution, and being substantially immiscible at or near the absorption temperature of the extracting solution, produces a marked increase in the vapor pressure of the sulphur dioxide over the extracting solution during regeneration, and consequently materially assists in efficiently liberating the absorbed sulphur dioxide from the solution.

The present invention contemplates broadly the recovery of sulphur dioxide, or other acidic gases such as carbon dioxide or hydrogen sulphide, from an extracting solution by adding an acid having the characteristics described above to the hot solution as it enters the regenerator, and allowing the solution, now containing the organic acid as well as the extracting medium, to flow over contact surfaces counter-current to the vapors from the boiling solution, drawing off the solution, with the acidic gas removed therefrom by the vapors, at the bottom of the regenerator, and then cooling and separating the organic acid from the cold solution prior to re-use of the cold solution in the absorption phase of the process.

Other features and advantages of the invention will become more apparent from the following detailed description which, taken in conjunction with the accompanying drawing, will disclose to those skilled in the art the particular apparatus and the method followed in my present invention.

The drawing illustrates diagrammatically the apparatus and flow cycle involved in the present invention.

Referring now to the drawing in more detail, there is indicated at 5 a scrubber or absorption tower which may be of any desired type and which has the inlet 6 for admitting waste gases containing sulphur dioxide or gases containing an acidic gas, such as sulphur dioxide, carbon dioxide or hydrogen sulphide, into the lower end of the scrubber. This gas is passed over the cooling coils 7 controlled by the valves 8, and then upwardly in counter-current contact with the absorbing solution projected from the distributors 9. The treated gases, with the acidic gas removed, pass through suitable baffles 10 and outwardly to exhaust through the outlet conduit 12.

The solution projected from the distributors 9, which absorbs the sulphur dioxide or other acidic gas during its downward movement, and which also assumes approximately the temperature of the cooling coils 7 in its downward movement, is withdrawn from the scrubber 5 through the conduit 13, and from this conduit passes into a suitable heat exchanger 14. From the heat exchanger 14, the extracting solution passes through a pre-heating coil 15 controlled by the valves 16, and thence through suitable distributor means 17 into the top of the regenerator chamber 18, which may be of the packed type. In this chamber, the extracting solution is contacted by the vapors rising from the heated solution indicated at 19 in the bottom of the tank. This solution may be heated by steam coils 20, by a submersion heater, or in any other suitable manner, the effective amount of heating being controlled by the valves 22.

In the regeneration chamber 18, the extracting solution is heated to a temperature such that the absorbed sulphur dioxide or other acidic gas is liberated therefrom, and the regenerated solution passes outwardly from the bottom of the chamber 18 through the conduit 23 and back through the heat exchanger 14, whereby the heat of the regenerated solution is effective to impart a certain amount of heat to the extracting solution passing from the conduit 13 into the heat exchanger 14. From the heat exchanger 14 which serves to provide some cooling of the regenerated solution, this solution passes into the cooling chamber 24 which is provided with the cooling coils 25 controlled by the valves 26, and the solution is then cooled to approximately the required absorption temperature.

From the cooling chamber 24, the solution passes through conduit 27 into the trap 28, and from the trap 28 passes through the conduit 29 to the distributors 9 disposed in the scrubbing chamber.

This much of the cycle of the process has been described in my above referred to copending application, and discloses the general cyclic process for the absorption and subsequent removal or liberation of sulphur dioxide or other acidic gases from a mixture of gases containing the same.

The solution entering the chamber 5 is a solution having a certain optimum concentration of ammonium sulphite and ammonium bisulphite, determined in accordance with the disclosure of my copending application, Serial No. 55,713, filed December 23, 1935, suitably modified to account for the presence of the liquid acid in the regenerator, which concentration is optimum for the various conditions of operation affecting the process, such as the efficiency of the absorption tower and the regenerator chamber, the absorption temperature, the regeneration temperature, and the concentration of the acidic gas in the gases being treated.

With the process as heretofore described, the cost of driving off the absorbed acidic gas from the extracting solution in the regenerator chamber 18 has prevented widespread commercial application of the process. However, I have found that by modifying the solution entering the chamber 18, the vapor pressure of the sulphur dioxide over the solution may be materially increased, which results in liberation of more sulphur dioxide per unit of heat required, or results in the liberation of the same amount of sulphur dioxide with a smaller quantity of heat. This increase in vapor pressure is provided by the introduction of a liquid organic acid which is relatively insoluble in the extracting solution at the absorption temperature, and which has high solubility at the regeneration temperature. Thus, an acid which has the characteristic of a critical solution temperature with respect to the extracting solution at or near the boiling point of water is most desirable.

To utilize this concept, I provide a secondary cycle in the process of removing and recovering such acidic gases, comprising the introduction, from the trap 28, of a liquid acid through the conduit 30 into the T connection 32 through which the extracting solution passes after leaving the heat exchanger 14. The acid introduced at 32 is then heated with the solution in the pre-heater 15 and is discharged into the regenerating chamber. In this chamber its solubility in the extracting solution is materially increased. This, in turn, increases the acidity of the solution to an extent such that liberation of the absorbed sulphur dioxide is materially increased.

The added liquid acid, together with the regenerated solution, is conducted from the regenerator chamber 18 through the conduit 23 to the trap 28. By this time sufficient cooling of the regenerated extracting solution has been effected to lower its temperature to approximately the absorption temperature. This results in rendering the added acid either insoluble or only slightly soluble in the extracting solution, and consequently the acid, or a large portion thereof, may be separated from the solution in the trap 28, whereby the liquid entering the scrubbing chamber 5 is relatively free of the added acid. Thus the cycle for the added acid which promotes the efficiency of liberation of the sulphur dioxide is effective only for a part of the cycle of the main portion of the process, and does not enter into the absorption phase of the process at all.

Acids which I have found to be desirable for this use are those which have substantially little or no solubility in the solution at the absorption temperature and whose solubility increases rapidly with increase in temperature at least up to or near the boiling point of the solution. Among such acids suitable for this purpose are butyric, valeric and caproic acid, both the normal and isomeric acids of this group being capable of use and having the desired characteristics.

The apparatus disclosed also illustrates the use of an ammonia scrubber 33 in which the ammonia vapors, which are carried upwardly through the regenerating chamber 18 with the liberated sulphur dioxide and which pass outwardly through the conduit 34, are removed from the sulphur dioxide, and the sulphur dioxide with water vapor is passed through the conduit 35 into the separating chamber 36, the sulphur dioxide passing outwardly from this chamber through the conduit 37. Suitable cooling means 38 are provided for condensing the water vapor carried with the sulphur dioxide, and this water vapor, condensed in the form of water, is conducted through the conduit 39 back into the lower portion of the chamber 18. Similarly, the ammonia vapors scrubbed from the sulphur dioxide vapors in the chamber 33 are returned to the regenerator chamber through the conduit 40, a portion of the water in the conduit 39 being by-passed through the conduit 42 and being introduced into the chamber 33 through the distributing nozzle 43. However, these features of the process form no part of the present invention, and are described in more detail and form a part of the invention disclosed in the copending application of myself and Alamjit D. Singh, Serial No. 97,550, filed August 24, 1936.

It will therefore be apparent that I have provided a process of removing and recovering sulphur dioxide or other acidic gases from mixtures of gases containing one of the gases to be recovered wherein the vapor pressure of the sulphur dioxide is increased by the addition of a liquid organic acid which is substantially insoluble in the extracting solution at the absorption temperature, and whose solubility increases and preferably becomes complete at or near the regenerating temperature of the solution. Thus the added acid is capable of being added to the extracting solution as it moves toward the regenerator, and can be readily removed from the regenerated solution prior to use of this solution for absorption, thereby in no way interfering with the absorption phase of the process, and thus not being involved in any secondary reactions in the absorber, such as were produced in prior attempts to employ such a shift in the acidity of the solution being regenerated. The ancillary reactions, such as decomposition, precipitation and the like, which would take place if the acid were permitted to remain with the extracting solution throughout the entire cycle of its flow in the process, are eliminated by the present process, and the efficiency of the process is thereby materially increased without any loss of the medium employed for increasing this efficiency. Also, by causing the secondary reaction or shifting of the acidity of the solution, in order to liberate more sulphur dioxide per unit heat applied, to take place in the regenerator itself, where the maximum effect on the sulphur dioxide vapor pressure is desired, the efficiency of the process is materially increased without increasing the cost of pumping this acid through the entire cycle of flow.

It is of course to be understood that suitable pumping means will be provided for insuring proper flow of the solutions to and from the regenerator, with suitable flow restriction means between the conduits 42 and 40. Also, any desired type of float valve control or the like will be employed in the trap 28 to insure separation of the acid from the cooled liquor solution.

I am aware that various modifications and changes may be made in certain features of the present invention without, however, departing from the underlying principles thereof, and I therefore intend to be limited only as defined by the scope and spirit of the appended claims.

I claim:

1. The method of recovering sulphur dioxide from waste gases containing the same which comprises contacting said gases with a cold aqueous solution of a sulphite selected from the group consisting of alkali metal sulphites and ammonium sulphite, heating said solution, adding to said solution a liquid organic acid selected from the group consisting of n-butyric acid, iso-butyric acid, n-valeric acid, iso-valeric acid, n-caproic acid, and iso-caproic acid, the combined action of the liquid organic acid and heat liberating sulphur dioxide from the solution, cooling said solution after liberation of said sulphur dioxide, and separating said organic acid from said cooled solution prior to re-use of said solution for absorption.

2. In the process of recovering sulphur dioxide from waste gases containing the same, wherein a cooled aqueous solution of a sulphite and a bisulphite of ammonia is employed for absorbing sulphur dioxide from said gases and is heated to liberate the absorbed sulphur dioxide, the novel step comprising adding to said solution to be heated liquid butyric acid, and removing said acid from said solution prior to re-use of said solution for absorption.

3. In the process of recovering sulphur dioxide from waste gases containing the same, wherein a cooled aqueous solution of a sulphite and a bisulphite of ammonia is employed for absorbing sulphur dioxide from said gases and is heated to liberate the absorbed sulphur dioxide, the novel step comprising adding to said solution to be heated liquid valeric acid, and removing said acid from said solution prior to re-use of said solution for absorption.

4. In the process of recovering sulphur dioxide from waste gases containing the same, wherein a cooled aqueous solution of a sulphite and a bisulphite of ammonia is employed for absorbing sulphur dioxide from said gases and is heated to liberate the absorbed sulphur dioxide, the novel step comprising adding to said solution to be heated liquid caproic acid, and removing said acid from said solution prior to re-use of said solution for absorption.

5. The method of increasing the vapor pressure of sulphur dioxide over an ammonium sulphite-bisulphite solution heated to or near the normal boiling point of the solution during regeneration, which comprises adding to said solution a liquid organic acid of the group consisting of butyric, valeric and caproic acids capable of displacing sulphur dioxide therefrom.

HENRY F. JOHNSTONE.